US010516188B2

United States Patent
Onoda

(10) Patent No.: US 10,516,188 B2
(45) Date of Patent: Dec. 24, 2019

(54) WOUND ELECTRODE BODY LITHIUM ION BATTERY HAVING ACTIVE ELECTRODE MATERIAL LAYERS OF DIFFERENT WIDTHS

(71) Applicant: TOYOTA JIDOSHA KABUSHIKI KAISHA, Toyota-shi, Aichi-ken (JP)

(72) Inventor: Yusuke Onoda, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 151 days.

(21) Appl. No.: 15/508,706

(22) PCT Filed: Sep. 4, 2015

(86) PCT No.: PCT/IB2015/001514
§ 371 (c)(1),
(2) Date: Mar. 3, 2017

(87) PCT Pub. No.: WO2016/034936
PCT Pub. Date: Mar. 10, 2016

(65) Prior Publication Data
US 2017/0256822 A1 Sep. 7, 2017

(30) Foreign Application Priority Data
Sep. 5, 2014 (JP) ................................. 2014-181443

(51) Int. Cl.
*H01M 10/0587* (2010.01)
*H01M 4/04* (2006.01)
(Continued)

(52) U.S. Cl.
CPC ..... *H01M 10/0587* (2013.01); *H01M 4/0404* (2013.01); *H01M 4/0435* (2013.01);
(Continued)

(58) Field of Classification Search
CPC .......... H01M 10/0587; H01M 4/0404; H01M 4/131; H01M 4/133
See application file for complete search history.

(56) References Cited

U.S. PATENT DOCUMENTS

2012/0288737 A1  11/2012  Nakano et al.
2013/0337305 A1*  12/2013  Nagai ................. H01M 4/505
                                                  429/94
2016/0056472 A1*  2/2016  Abe ........................ H01M 4/13
                                                  429/94

FOREIGN PATENT DOCUMENTS

JP     2013-182712 A    9/2013
JP     2013-243031 A   12/2013
(Continued)

*Primary Examiner* — Jonathan G Jelsma
(74) *Attorney, Agent, or Firm* — Sughrue Mion, PLLC

(57) ABSTRACT

Provided is a lithium ion battery including a wound electrode body, in which a negative electrode active material layer 24 of the lithium ion battery is formed to be wider than a positive electrode active material layer 14 and has a facing portion 24c which faces the positive electrode active material layer 14 and a non-facing portions 24n which do not face the positive electrode active material layer 14. In a facing center region 24a of the facing portion 24c excluding regions 24b adjacent to the non-facing portion, plural straight measurement lines are set in a region ranging from one end portion to another end portion in the width direction. When the resistance of each measurement line is measured, in all the measurement lines, a highest resistance point is present in a length region of less than 15% from a center $C_0$ of the facing center region 24a.

8 Claims, 6 Drawing Sheets

(51) Int. Cl.
    *H01M 4/131*      (2010.01)
    *H01M 4/133*      (2010.01)
    *H01M 10/0525*    (2010.01)
    *H01M 4/1391*     (2010.01)
    *H01M 4/1393*     (2010.01)
    *H01M 4/505*      (2010.01)
    *H01M 4/525*      (2010.01)
    *H01M 4/583*      (2010.01)
    *H01M 10/0568*    (2010.01)
    *H01M 10/0569*    (2010.01)

(52) U.S. Cl.
    CPC ........... *H01M 4/131* (2013.01); *H01M 4/133* (2013.01); *H01M 4/1391* (2013.01); *H01M 4/1393* (2013.01); *H01M 4/505* (2013.01); *H01M 4/525* (2013.01); *H01M 4/583* (2013.01); *H01M 10/0525* (2013.01); *H01M 10/0568* (2013.01); *H01M 10/0569* (2013.01); *H01M 2300/002* (2013.01); *H01M 2300/004* (2013.01)

(56) References Cited

FOREIGN PATENT DOCUMENTS

| | | |
|---|---|---|
| JP | 2013-247009 A | 12/2013 |
| JP | 2014-025850 A | 2/2014 |
| JP | 2014-130729 A | 7/2014 |
| JP | 2015-011969 A | 1/2015 |
| KR | 10-2012-0052896 A | 5/2012 |

* cited by examiner

HORIZONTAL MOUNTING

VERTICAL MOUNTING

EXAMPLE

COMPARATIVE EXAMPLE 1

COMPARATIVE EXAMPLE 2

COMPARATIVE EXAMPLE 3

WOUND ELECTRODE BODY LITHIUM ION BATTERY HAVING ACTIVE ELECTRODE MATERIAL LAYERS OF DIFFERENT WIDTHS

CROSS REFERENCE TO RELATED APPLICATIONS

This application is a National Stage of International Application No. PCT/IB2015/001514 filed Sep. 4, 2015, claiming priority based on Japanese Patent Application No. 2014-181443 filed Sep. 5, 2014, the contents of all of which are incorporated herein by reference in their entirety.

BACKGROUND OF THE INVENTION

1. Field of the Invention

The present invention relates to a lithium ion battery. Specifically, the invention relates to a lithium ion battery including a negative electrode on which a film derived from an oxalato complex compound is formed.

2. Description of Related Art

In a nonaqueous secondary battery such as a lithium ion battery, a nonaqueous electrolytic solution may contain a film forming agent (for example, a compound containing an oxalato complex as an anion), for example, in order to improve durability (refer to Japanese Patent Application Publication No. 2013-182712 (JP 2013-182712 A) and Japanese Patent Application Publication No. 2013-247009 (JP 2013-247009 A)). In such a battery, typically, the film forming agent is reduced and decomposed during initial charging. A stable film is formed on a surface of a negative electrode. As a result, further decomposition of the nonaqueous electrolytic solution and deterioration of an active material can be suppressed, and the durability of the battery can be improved.

However, for example, in a large-sized battery having a large electrode body (wide electrode area), the penetration amount of a film forming agent varies in a penetration direction of a nonaqueous electrolytic solution (typically, at an end portion and the center of the electrode body in a width direction thereof), and thus the thickness of a film formed in the penetration direction may be non-uniform. As a technique relating to this problem, for example, JP 2013-182712 A discloses a lithium ion battery in which at least one member of a positive electrode, a negative electrode, and a separator includes a surface-modified portion (a portion in which the impregnating ability of a nonaqueous electrolytic solution is improved) that is provided at the center of the member in a width direction thereof.

SUMMARY OF THE INVENTION

According to the configuration disclosed in JP 2013-182712 A, a uniform film can be formed on a surface of a negative electrode, and high-temperature cycle characteristics can be improved. However, according to the investigation by the present inventors, even with the above-described technique, it is difficult to completely solve the non-uniformity in the thickness of a film, and a portion in which the resistance locally increases may be present. In this portion in which the resistance locally increases, a charging-discharging balance with a positive electrode facing the portion is lost, and lithium is likely to be deposited thereon. As a result, when high-rate charging and discharging is repeated in a low-temperature environment of, for example, 0° C. or lower, lithium is deposited centering on the portion in which the resistance locally increases, and the capacity retention may significantly decrease.

The invention provides a lithium ion battery in which an addition effect of a film forming agent is fully exhibited, and high-rate cycle characteristics are superior even in a low-temperature environment. The invention also provides a method of manufacturing the above-described lithium ion battery.

In order to solve the above-described problems, the present inventors studied from various perspectives. As a result, the present inventors conceived a configuration of disposing the portion in which the resistance locally increases at an appropriate position. As a result of further thorough investigation, the invention has been completed.

According to an aspect of the invention, a lithium ion battery includes a wound electrode body, a nonaqueous electrolytic solution, and a battery case. The wound electrode body is obtained by disposing an elongated positive electrode and an elongated negative electrode to face each other in an insulated state so as to obtain a laminate and winding the laminate in a longitudinal direction by a predetermined number of turns. The elongated positive electrode includes an elongated positive electrode current collector and a positive electrode active material layer attached to the positive electrode current collector. The elongated negative electrode includes an elongated negative electrode current collector and a negative electrode active material layer attached to the negative electrode current collector. The nonaqueous electrolytic solution contains at least a supporting electrolyte and a nonaqueous solvent. The battery case accommodates the wound electrode body and the nonaqueous electrolytic solution. Here, the negative electrode active material layer includes a film containing a component derived from an oxalato complex compound and is formed to be wider than the positive electrode active material layer in a width direction perpendicular to the longitudinal direction. The negative electrode active material layer includes a facing portion which faces the positive electrode active material layer and non-facing portions which do not face the positive electrode active material layer. Further, in measurement lines of the facing portion, a highest resistance value is present in a length region of less than 15% from a center of a facing center region in the width direction. The facing center region is a region of the facing portion excluding regions adjacent to the non-facing portions. The measurement lines are plural straight lines ranging from one end portion to another end portion in the width direction. The resistance value is measured at each of the measurement lines.

According to the above-described configuration, even when low-temperature high-rate charging and discharging is repeated, a highly durable lithium ion battery in which the deposition of lithium is suppressed can be realized.

In this specification, a winding direction of the wound electrode body will be referred to as "longitudinal direction". A winding axial direction of the wound electrode body (in other words, a direction perpendicular to the longitudinal direction) will be referred to as "width direction". In addition, the length in the width direction may also be referred to simply as "width length". In this specification, "facing center region" refers to a region of the facing portion excluding regions adjacent to the non-facing portions (that is, facing center region=facing portion Region-Regions Adjacent to Non-Facing Portions). In this specification, "regions adjacent to the non-facing portions" refers to regions where the negative electrode active material layer overlaps the non-facing portions when being folded at boundaries between the facing portion and the non-facing portions in a plan view (in the width direction). In other words, "regions adjacent to the non-facing portions" refers to regions which extend from the boundaries between the facing portion and the non-facing portions to the facing portion and have the same length as that of the non-facing portions in the width direction.

In the above-described aspect, the measurement lines may be set such that one or more lines are positioned in each of three regions into which the facing center region at an appropriate number of turns is equally divided in the longitudinal direction, that is, three or more lines in total are positioned in the three regions.

In the above-described aspect, in all the measurement lines, a highest resistance value may be present in a length region of less than 10% from the center of the facing center region in the width direction.

In the above-described aspect, a surplus nonaqueous electrolytic solution may be present in a gap between the wound electrode body and the battery case. In addition, at least a part of the wound electrode body may be dipped in the surplus nonaqueous electrolytic solution in an environment of 25° C.

In the above-described aspect, a length of the facing center region in the width direction may be 92 mm or longer.

In the above-described aspect, the negative electrode active material layer may include the non-facing portions at opposite end portions of the facing portion in the width direction. In addition, a length of each of the non-facing portions in the width direction may be 0.5 mm or longer. As a result, for example, even when winding deviation occurs during the winding of the electrode body, the protrusion of the positive electrode active material layer from the negative electrode active material layer in the width direction can be prevented. Therefore, the deposition of lithium on the negative electrode can be more accurately prevented.

According to another aspect of the invention, a method of manufacturing the above-described lithium ion battery includes: adding an oxalato complex compound to the nonaqueous electrolytic solution to prepare a nonaqueous electrolytic solution containing an oxalato complex compound; accommodating the wound electrode body and the nonaqueous electrolytic solution containing an oxalato complex compound in the battery case under the atmospheric pressure to construct a battery assembly; impregnating the wound electrode body with the nonaqueous electrolytic solution containing an oxalato complex compound while maintaining an internal pressure of the battery case to be the atmospheric pressure and maintaining the width direction of the wound electrode body to be horizontal, in which a surplus nonaqueous electrolytic solution may remain in a gap between the wound electrode body and the battery case after the impregnation; and initially charging the battery assembly in a state where at least a part of the wound electrode body is dipped in the surplus nonaqueous electrolytic solution.

In the above-described aspect, lithium bis(oxalato)borate may be used as the oxalato complex compound. An addition amount of the lithium bis(oxalato)borate may be 0.1 mass % or more with respect to the total mass of the nonaqueous electrolytic solution.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 5A and 5B are schematic diagrams showing a method of mounting a battery when being impregnated with a nonaqueous electrolytic solution, in which FIG. 5A shows a horizontal-mounting state, and FIG. 5B shows a vertical-mounting state;

FIGS. 6A to 6D are graphs showing a resistance in an absolute facing region of a negative electrode active material layer, in which FIG. 6A shows the results of Example 1, FIG. 6B shows the results of Comparative Example 1, FIG. 6C shows the results of Comparative Example 2, and FIG. 6D shows the results of Comparative Example 3.

DETAILED DESCRIPTION OF EMBODIMENTS

Figure 1:
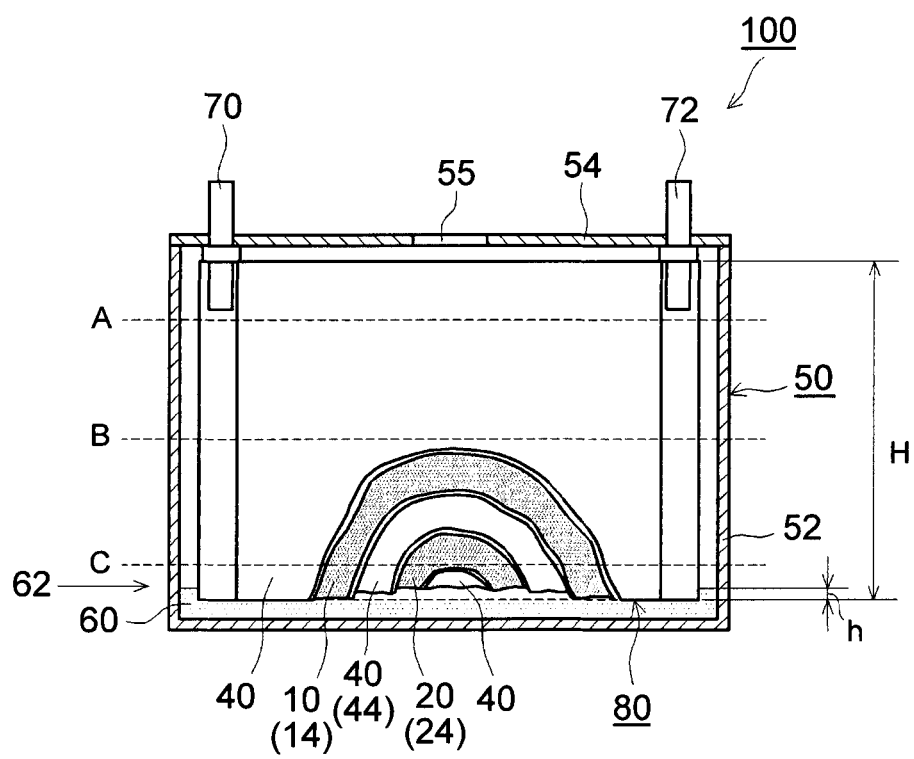
FIG. 1 is a longitudinal sectional view showing a lithium ion battery according to an embodiment of the invention.

Preferred embodiments of the invention are described below. Matters (for example, components or a general manufacturing process of a battery which is not a characteristic of the invention) necessary to practice this invention other than those (for example, characteristics of an active material layer) specifically referred to in this description may be understood as design matters based on the related art in the pertinent field for a person of ordinary skills in the art. The invention can be practiced based on the contents disclosed in this description and common technical knowledge in the subject field.

<Method of Manufacturing Lithium Ion Battery>

A configuration of a lithium ion battery disclosed herein has a close relationship with a manufacturing method thereof. Therefore, first, a preferred example of the manufacturing method will be described. Roughly, the method of manufacturing the lithium ion battery disclosed herein includes: (1) wound electrode body preparation; (2) nonaqueous electrolytic solution preparation; (3) battery assembly construction; (4) nonaqueous electrolytic solution impregnation; and (5) initial charging. In addition to these steps, the method may further include another step at an arbitrary stage. Hereinafter, each step will be sequentially described.

(1) Wound Electrode Body Preparation

In the manufacturing method disclosed herein, first, a wound electrode body is prepared. In a preferred example, an elongated positive electrode and an negative electrode are disposed to face each other (typically, with a separator interposed therebetween) in an insulated state so as to obtain a laminate, and this laminate is wound in a longitudinal direction by a predetermined number of turns. As a result, a wound electrode body is prepared. The winding number of turns is not particularly limited but is preferably about 20 turns or more (for example, 20 turns to 150 turns) from the viewpoint of increasing the capacity of the battery. This configuration of the wound electrode body is preferable from the viewpoint of realizing high energy density and high capacity. It is necessary that the nonaqueous electrolytic solution penetrate into the wound electrode body from opposite end portions thereof in the width direction (winding axial direction). That is, an injection hole of the nonaqueous electrolytic solution is narrower relative to the total area of the electrode. Therefore, the penetration amount of a film forming agent into the electrode body is likely to be non-uniform, and the application of the invention is particularly effective.

The positive electrode may include, for example, an elongated positive electrode current collector; and a positive electrode active material layer attached to the positive electrode current collector. As the positive electrode current collector, a conductive member formed of highly conductive metal (for example, aluminum or nickel) may be preferably used. The positive electrode active material layer is formed on the surface of the positive electrode current collector to have a predetermined width along the longitudinal direction. The positive electrode active material layer includes at least a positive electrode active material. As the positive electrode active material, one kind or two or more kinds may be used among various known materials which can be used as a positive electrode active material of a lithium ion battery. Preferable examples of the positive electrode active material include layered or spinel type lithium composite metal oxides (for example, $LiNiO_2$, $LiCoO_2$, $LiFeO_2$, $LiMn_2O_4$, $LiNi_{1/3}Co_{1/3}Mn_{1/3}O_2$, $LiNi_{0.5}Mn_{1.5}O_4$, and $LiFePO_4$). Among these, a lithium nickel cobalt manganese composite oxide having a layered structure is preferably used from the viewpoints of heat stability and energy density.

In addition to the positive electrode active material, the positive electrode active material layer may optionally contain one material or two or more materials which can be used as components of a positive electrode active material layer in a general lithium ion battery. Examples of the material include a conductive material and a binder. Examples of the conductive material include carbon materials such as carbon blacks (for example, acetylene black and Ketjen black), activated carbon, graphite, and carbon fiber. Examples of the binder, include vinyl halide resins such as polyvinylidene fluoride (PVdF); and polyalkylene oxides such as polyethylene oxide (PEO). In addition, the positive electrode active material layer may further contain various additives (for example, a dispersant or a thickener) within a range where the effects of the invention do not significantly deteriorate.

The mass (coating weight) of the positive electrode active material layer which is provided per unit area of the positive electrode current collector, for example, per single surface of the positive electrode current collector may be 4 mg/cm$^2$ or more (preferably 5 mg/cm$^2$ or more) and may be 25 mg/cm$^2$ or less (typically 20 mg/cm$^2$ or less) from the viewpoint of realizing high energy density and high output density.

The negative electrode may include: for example, an elongated negative electrode current collector; and a negative electrode active material layer attached to the negative electrode current collector. As the negative electrode current collector, a conductive member formed of highly conductive metal (for example, copper or nickel) may be preferably used. The negative electrode active material layer is formed on the surface of the negative electrode current collector to have a width longer than that of the positive electrode active material layer along the longitudinal direction. The negative electrode active material layer includes at least a negative electrode active material. As the negative electrode active material, one kind or two or more kinds may be used among various known materials which can be used as a negative electrode active material of a lithium ion battery. Preferable examples of the negative electrode active material include carbon materials such as graphite, non-graphitizable carbon (hard carbon), graphitizable carbon (soft carbon), and a combination thereof. Among these, a graphite-based carbon material is preferable from the viewpoint of realizing a battery having high energy density. In this specification, "graphite-based carbon material" is a collective term for a carbon material containing only graphite and a carbon material containing 50 mass % or more (typically 80 mass % or more; for example, 90 mass % or more) of graphite with respect to the total mass of the carbon material.

In addition to the negative electrode active material, the negative electrode active material layer may optionally contain one material or two or more materials which can be used as components of a negative electrode active material layer in a general lithium ion battery. Examples of the material include a binder and various additives. Examples of the binder include styrene-butadiene rubber (SBR), polyvinylidene fluoride (PVdF), and polytetrafluoroethylene (PTFE). Moreover, various additives such as a thickener, a dispersant, or a conductive material can be appropriately used. Examples of the thickener include celluloses such as carboxymethyl cellulose (CMC) and methyl cellulose (MC).

The mass (coating weight) of the negative electrode active material layer which is provided per unit area of the negative electrode current collector, for example, per single surface of the negative electrode current collector may be 2 mg/cm$^2$ or more (preferably 3 mg/cm$^2$ or more) and may be typically 30 mg/cm$^2$ or less (for example, 20 mg/cm$^2$ or less) from the viewpoint of realizing high energy density and high output density.

As the separator, any separator may be preferably used as long as it insulates the positive electrode active material layer and the negative electrode active material layer from each other and has a function of holding the nonaqueous electrolytic solution and a shutdown function. Preferable examples of the separator include a porous resin sheet (film) formed of a resin such as polyethylene (PE), polypropylene (PP), polyester, cellulose, or polyamide. Among these, a polyolefin-based porous resin sheet (for example, PE or PP) is preferable. The separator may have a single-layer structure or a multi-layer structure in which two or more porous resin sheets having different materials and properties are laminated. Examples of the multi-layer structure include a three-layer structure (that is, a three-layer structure of PP/PE/PP) in which a polypropylene (PP) layer is laminated on both surfaces of a polyethylene (PE) layer. In addition, for example, in order to prevent internal short-circuit, the separator may include a porous heat resistance layer containing inorganic compound particles (inorganic filler) that is formed on a surface of the above-described porous resin sheet.

(2) Nonaqueous Electrolytic Solution Preparation

In the manufacturing method disclosed herein, next, a nonaqueous electrolytic solution is prepared. In a preferred example, a supporting electrolyte and an oxalato complex compound are added to a nonaqueous solvent, and the components are stirred until they are uniformly mixed. The nonaqueous electrolytic solution is liquid at room temperature (for example, 25° C.) and, in a preferred embodiment, is usually liquid in a usage environment of a battery (for example, in an environment having a temperature range of −30° C. to 60° C.). As the nonaqueous solvent, various organic solvents which can be used in a nonaqueous electrolytic solution of a general lithium ion battery, for example, carbonates, ethers, esters, nitriles, sulfones, and lactones can be used. Preferable examples of the nonaqueous solvent include ethylene carbonate (EC), propylene carbonate (PC), diethyl carbonate (DEC), dimethyl carbonate (DMC), and ethyl methyl carbonate (EMC). Among these nonaqueous solvents, one kind can be used alone, or two or more kinds can be appropriately used in combination.

As the supporting electrolyte, as long as they contain a lithium ion as a charge carrier, one compound or two or more compounds can be used among various compounds which can be used as a supporting electrolyte of a lithium ion battery. Preferable examples of the supporting electrolyte include $LiPF_6$, $LiBF_4$, $LiClO_4$, $LiAsF_6$, $Li(CF_3SO_2)_2N$, and $LiCF_3SO_3$. Among these, $LiPF_6$ is preferable. In addition, the concentration of the supporting electrolyte is preferably adjusted to be 0.7 mol/L to 1.3 mol/L with respect to the total amount of the nonaqueous electrolytic solution.

As the oxalato complex compound, one kind or a combination of two or more kinds selected from oxalato complex compounds produced using various well-known methods and various generally available oxalato complex compounds may be used without any particular limitation. The oxalato complex compound contains a complex which is formed by at least one oxalate ion ($C_2O_4^{2-}$) forming a coordinate bond with a central element. Examples of the central element include metalloid elements represented by boron (B) and phosphorus (P). Specific examples of the oxalato complex compound include (i) a compound having a tetracoordinate structure in which at least one oxalate ion ($C_2O_4^{2-}$) is coordinated to boron (B) as a central atom; and (ii) a compound having a hexacoordinate structure in which at least one oxalate ion ($C_2O_4^{2-}$) is coordinated to phosphorus (P) as a central atom. Among these, a compound containing the same cation species (charge carrying ion) as that of the supporting electrolyte is particularly preferable. Preferable examples of (i) include lithium bis(oxalato)borate ($Li[B(C_2O_4)_2]$; LiBOB) and lithium difluoro(oxalato)borate ($Li[BF_2(C_2O_4)]$; LBFO). Preferable examples of (ii) include lithium bis(oxalato)phosphate ($Li[P(C_2O_4)_3]$), and lithium difluorobis(oxalato)phosphate ($Li[PF_2(C_2O_4)_2]$; LPFO), and lithium tris(oxalato)phosphate. Among these, LIBOB is preferable from the viewpoint of highly suppressing non-uniformity in the thickness of a film.

The concentration of the oxalato complex compound may vary depending on, for example, the kind and properties (for example, particle size or specific surface area) of the negative electrode active material. From the viewpoint of exhibiting the effects of the invention at a high level, in a preferred example, the content of the oxalato complex compound may be about 0.05 mass % or more (preferably 0.1 mass % or more, more preferably 0.2 mass % or more, and still more preferably 0.35 mass % or more) with respect to the total mass of the nonaqueous electrolytic solution. The upper limit of the content may be typically 2 mass % or less (for example, 1 mass % or less). As a result, an increase in resistance can be minimized, and far superior input and output characteristics can be realized.

In addition to the above-described components, optionally, the nonaqueous electrolytic solution may further contain various additives within a range where the effects of the invention do not significantly deteriorate. These additives are used for one or two or more of the purposes including: improvement of cycle characteristics of a battery; improvement of high-temperature storage characteristics; improvement of an initial charge-discharge efficiency; improvement of input and output characteristics; and improvement of overcharge resistance (an increase in the amount of gas produced during overcharge). Specific examples of the additives include vinylene carbonate (VC), vinyl ethylene carbonate (VEC), biphenyl (BP), and cyclohexylbenzene (CHB).

(3) Battery Assembly Construction

In the manufacturing method disclosed herein, next, a battery assembly is constructed using the wound electrode body and the nonaqueous electrolytic solution. In a preferred example, the wound electrode body is accommodated in the battery case, and then the nonaqueous electrolytic solution is injected into the battery case. More specifically, for example, first, a positive electrode terminal and a negative electrode terminal are attached to a lid of the battery case, and these terminals are respectively welded to the positive electrode current collector and the negative electrode current collector which are exposed to end portions of the wound electrode body. Next, the wound electrode body connected to the lid is accommodated in the battery case through an opening thereof. At this time, the wound electrode body is preferably disposed such that the width direction thereof is horizontal. Typically, opposite end portions of the wound electrode body in the width direction function as injection holes of the nonaqueous electrolytic solution. Therefore, by disposing the wound electrode body such that the width direction thereof is horizontal, the nonaqueous electrolytic solution can uniformly penetrate into the wound electrode body through the opposite end portions in (4) the nonaqueous electrolytic solution impregnation described below. Next, the opening of the battery case and the lid are welded to each other, and then the nonaqueous electrolytic solution is injected through a liquid injection hole provided through the lid. In other words, the nonaqueous electrolytic solution is injected from immediately above the wound electrode body (in a direction perpendicular to the width direction of the wound electrode body). As a result, the battery assembly can be constructed.

In this specification, "battery assembly" refers to an assembly which is fabricated before the initial charging described below. For example, at this time, the lid of the battery case and the injection hole of the electrolytic solution may be sealed or may not be sealed.

The battery case is preferably formed of, for example, a light metal material such as aluminum or steel. The shape of the battery case (external shape of the container) may be, for example, a circular shape (a cylindrical shape, a coin shape, or a button shape), a hexahedron shape (a cuboid shape or a cube shape), or a shape obtained by processing and modifying the above-described shape.

The injection amount of the nonaqueous electrolytic solution is determined in consideration of the amount of the nonaqueous electrolytic solution impregnated into the wound electrode body and the necessary amount of a surplus nonaqueous electrolytic solution. Specifically, the injection amount of the nonaqueous electrolytic solution is determined such that a surplus nonaqueous electrolytic solution remains in a gap between the wound electrode body and the battery case and such that a part of the wound electrode body is dipped in the surplus nonaqueous electrolytic solution. The amount of the nonaqueous electrolytic solution impregnated into the wound electrode body can be considered as, for example, the sum of the void volumes of the positive electrode active material layer, the negative electrode active material layer, and the separator. The void volume of each member can be calculated, for example, using a mercury porosimeter based on mercury intrusion porosimetry which is well-known in the related art. In addition, the necessary amount of the surplus nonaqueous electrolytic solution can be calculated according to, for example, the following expression "Bottom Surface Area of Battery Case×(Height from Bottom Surface of Battery Case to Lowermost Portion of Wound Electrode Body)". On the other hand, from the viewpoint of cost, it is preferable that the amount of the surplus nonaqueous electrolytic solution is suppressed (preferably to the minimum necessary) not to be excessively large. For example, the injection amount may be adjusted such that, when the battery is disposed (regularly) in a predetermined posture, a height region of $1/10$ to $1/4$ of the height of the wound electrode body in the vertical direction is dipped in the surplus nonaqueous electrolytic solution.

(4) Nonaqueous Electrolytic Solution Impregnation

In the manufacturing method disclosed herein, next, the wound electrode body is sufficiently impregnated with the nonaqueous electrolytic solution. Specifically, the wound electrode body is left to stand (held) for a predetermined period of time while maintaining the width direction of the wound electrode body to be horizontal. As a result, the nonaqueous electrolytic solution can uniformly penetrate into the wound electrode body through the opposite end portions. The standing time varies depending on, for example, the size (area and width length) of the wound electrode body and typically may be several tens of minutes to several tens of hours. In addition, during the standing period, the atmospheric pressure is maintained without performing pressure adjustment such as an increase or a decrease in pressure. According to the investigation by the present inventors, by maintaining the width direction of the wound electrode body to be horizontal under the atmospheric pressure, the oxalato complex compound can be more appropriately disposed in the wound electrode body. In the manufacturing method disclosed herein, as described above, the injection amount of the nonaqueous electrolytic solution is determined such that the (surplus) nonaqueous electrolytic solution which is not impregnated into the wound electrode body is present even after the nonaqueous electrolytic solution impregnation step. Therefore, the surplus nonaqueous electrolytic solution remains in a gap between the wound electrode body and the battery case after the impregnation. Moreover, at least a part of the wound electrode body is positioned below the liquid surface of the surplus nonaqueous electrolytic solution in the vertical direction.

(5) Initial Charging

In the manufacturing method disclosed herein, next, the battery assembly is initially charged in a state where at least a part of the wound electrode body is dipped in the surplus nonaqueous electrolytic solution. The battery assembly is initially charged at a predetermined charging rate such that a voltage between the positive and negative electrodes reaches at least a decomposition potential or higher of the oxalato complex compound in the nonaqueous electrolytic solution. As a result, the oxalato complex compound is electrically decomposed. Typically, the oxalato complex compound is reduced and decomposed on the negative electrode. As a result, a film containing a component derived from the oxalato complex compound is formed on the surface of the negative electrode. The charging rate may be, for example, 10 C or lower (preferably 8 C or lower) from the viewpoint of forming a uniform film on the surface of the negative electrode. In addition, the charging rate may be, for example, 0.1 C or higher from the viewpoint of improving productivity. Although depending on, for example, the kinds of the oxalato complex compound and the active material to be used, typically, the end voltage may be a voltage shown when the SOC of the battery assembly is about 80% or higher (typically, 90% to 105%). For example, in a battery which is fully charged at 4.2 V, the end voltage may be about 3.8 V to 4.2 V. The initial charging may be performed once or may be performed two times or more, for example, while performing discharging therebetween. With the above-described manufacturing method, the lithium ion battery disclosed herein can be preferably manufactured.

<Lithium Ion Battery>

Although not particularly limited, hereinafter, a lithium ion battery according to an embodiment of the invention will be described with reference to the accompanying drawings. In the following drawings, parts or portions having the same function are represented by the same reference numerals, and the repeated description will not be made or will be simplified. In each drawing, a dimensional relationship (for example, length, width, or thickness) does not necessarily reflect the actual dimensional relationship.

FIG. 1 is a longitudinal sectional view schematically showing a cross-sectional structure of the lithium ion battery according to the embodiment. As shown in FIG. 1, the lithium ion battery 100 has a structure in which a wound electrode body 80, which is wound in a flat shape, and a surplus nonaqueous electrolytic solution 60 are accommodated in a flat rectangular battery case 50. Since each component of the lithium ion battery 100 is the same as described above regarding the manufacturing method, the detailed description thereof will not be repeated.

The battery case 50 includes: a flat rectangular (box shape) battery case body 52 having an open upper end; and a lid 54 that covers the opening. In a top surface (that is, the lid 54) of the battery case 50, a positive electrode terminal 70 for external connection, which is electrically connected to the positive electrode of the wound electrode body 80, and a negative electrode terminal 72, which is electrically connected to the negative electrode of the wound electrode body 80, are provided. As in the case of a battery case of a lithium ion battery in the related art, the lid 54 further includes a safety valve 55 for discharging gas, produced from the inside of the battery case 50, to the outside of the battery case 50.

The wound electrode body 80 disclosed herein is disposed such that a width direction thereof is horizontal. In addition, a predetermined gap is formed between the bottom of the battery case 50 and the wound electrode body 80. In other words, the lowermost portion of the wound electrode body 80 is not in contact with the bottom of the battery case 50. A cross-section of the wound electrode body 80 perpendicular to a winding axis has: two winding flat portions which face each other; and two winding R portions which are interposed between the two winding flat portions. In this embodiment, one (lower R portion) of the two winding R portions is disposed on a lower side (bottom side) of the battery case 50 in the vertical direction, and the other one (upper R portion) of the two winding R portions is disposed on a top side (lid 54 side) of the battery case 50 in the vertical direction.

Figure 2:
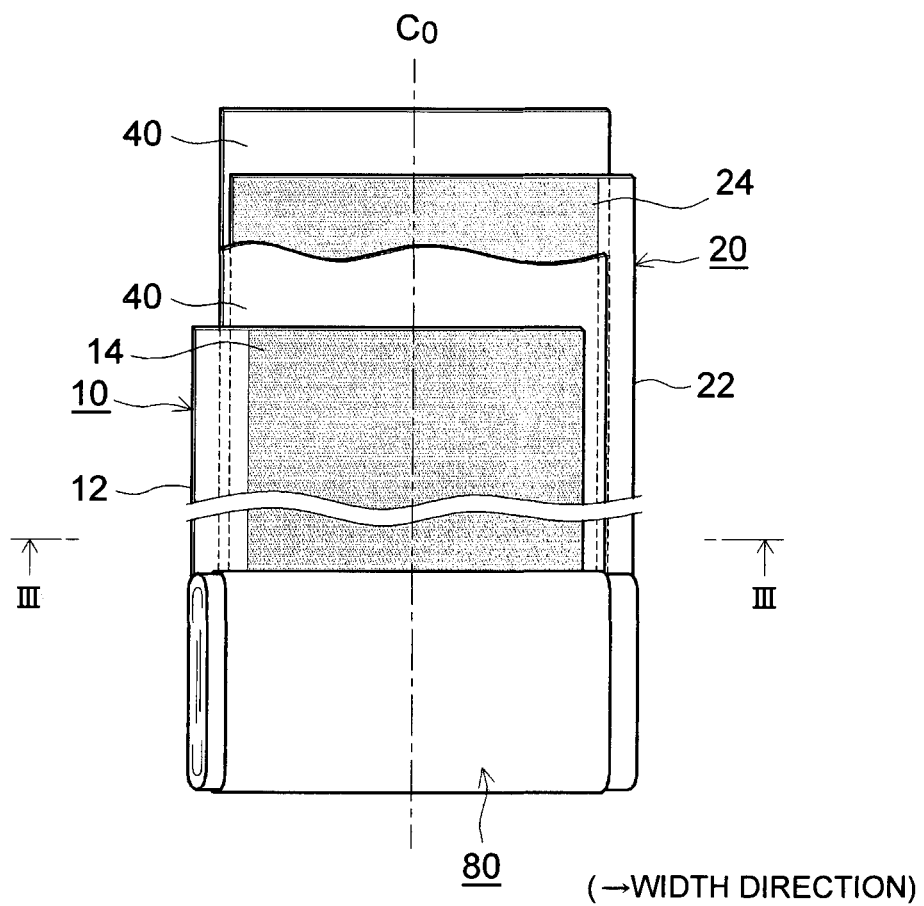
FIG. 2 is a schematic diagram showing a configuration of a wound electrode body 80 of FIG. 1.
Figure 3:
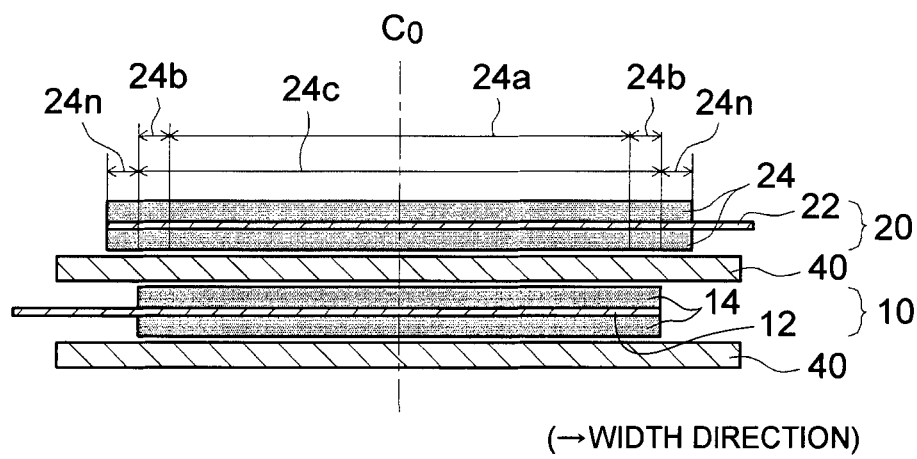
FIG. 3 is a cross-sectional view of the wound electrode body 80 taken along line III-III of FIG. 2.

FIG. 2 is a schematic diagram showing the configuration of the wound electrode body of FIG. 1. FIG. 3 is a cross-sectional view of the wound electrode body taken along line III-III of FIG. 2. As shown in FIGS. 1 to 3, the wound electrode body 80 is obtained by laminating an elongated positive electrode sheet 10, an elongated separator sheet 40, and an elongated negative electrode sheet 20 along a central line $C_0$ in the width direction so as to obtain a laminate and winding the laminate by a predetermined number of turns in a flat shape. The positive electrode sheet 10 includes: an elongated positive electrode current collector 12; and a positive electrode active material layer 14 that is formed on at least one surface (typically, on both surfaces) of the positive electrode current collector 12 in the longitudinal direction. The negative electrode sheet 20 includes: an elongated negative electrode current collector 22; and a negative electrode active material layer 24 that is formed on at least one surface (typically, on both surfaces) of the negative electrode current collector 22 in the longitudinal direction. In addition, the two elongated separator sheets 40 are arranged between the positive electrode active material layer 14 and the negative electrode active material layer 24 as an insulating layer for preventing direct contact therebetween.

A winding core portion is formed in the center of the wound electrode body 80 in a width direction which is defined as a direction moving from one end portion to another end portion in the winding axial direction, the winding core portion having a configuration in which the positive electrode active material layer 14, which is formed on the surface of the positive electrode current collector 12, and the negative electrode active material layer 24, which is formed on the surface of the negative electrode current collector 22, overlap each other to be densely laminated. In addition, at opposite end portions of the wound electrode body 80 in the winding axial direction, a positive electrode active material layer non-forming portion of the positive electrode sheet 10 and a negative electrode active material layer non-forming portion of the negative electrode sheet 20 protrude from the winding core portion to the outside, respectively. A positive electrode current collector plate is provided in the protrusion on the positive electrode side, and a negative electrode current collector plate is provided in the protrusion on the negative electrode side. The positive electrode current collector plate and the negative electrode current collector plate are electrically connected to the positive electrode terminal 70 and the negative electrode terminal 72, respectively.

As shown in FIGS. 2 and 3, in this embodiment, opposite end portions of the negative electrode active material layer 24 in the width direction extrude from the positive electrode active material layer 14 to the outside. Therefore, in the negative electrode active material layer 24, a facing portion 24c which faces the positive electrode active material layer 14 is disposed on the center thereof in the width direction. In addition, non-facing portions 24n which do not face the positive electrode active material layer 14 is disposed at opposite end portions in the width direction.

The facing portion 24c has a facing center region 24a and regions 24b adjacent to the non-facing portions. The regions 24b adjacent to the non-facing portions are literally disposed adjacent to the non-facing portions 24n. Therefore, during charging and discharging, the regions 24b may show behavior different from that of the facing center region 24a. Specifically, for example, when a high-current input (charging) is repeated, a charging-discharging balance is locally lost, and lithium ions cannot be accommodated. In this case, in the facing center region 24a, the lithium ions which cannot be accommodated may be deposited. On the other hand, in the regions 24b adjacent to the non-facing portions, the lithium ions can be stored in the non-facing portion 24n. That is, in the regions 24b adjacent to the non-facing portions, the deposition of lithium can be efficiently suppressed. Therefore, in consideration of the problem of the deposition of lithium, it is necessary to distinguish the facing center region 24a and the regions 24b adjacent to the non-facing portions from each other.

Although depending on, for example, the mechanical accuracy of a winding device, the width length of each of the non-facing portions 24n is about 0.5 mm or more, preferably 0.7 mm or more, and more preferably 1 mm or more. As a result, the deposition of lithium on the regions 24b adjacent to the non-facing portions, can be accurately suppressed. However, most of the lithium ions stored in the non-facing portions 24n contribute to the irreversible capacity. Therefore, from the viewpoint of suppressing an increase in irreversible capacity, the width length of each of the non-facing portions 24n is about 5 mm or less and preferably 3 mm or less. In addition, it is preferable that the non-facing portions 24n are provided at opposite end portions of the negative electrode active material layer 24 in the width direction, respectively. In the embodiment disclosed herein, the non-facing portions 24n having a length of about 2 mm are provided at opposite end portions of the negative electrode active material layer 24 in the width direction, respectively. The length (width length) of the facing portion 24c in the width direction is, for example, 50 mm or more and preferably 90 mm or more from the viewpoint of realizing high energy density and high capacity. In addition, the width length of the facing portion 24c may be, for example, 200 mm or less from the viewpoint of realizing high input and output densities. In the embodiment disclosed herein, the width length of the facing portion 24c is about 96 mm. In addition, in the technique disclosed herein, the length (width length) of each of the regions 24b adjacent to the non-facing portions in the width direction can be considered to be the same as the width length of each of the non-facing portions 24n. That is, in the embodiment disclosed herein, the regions 24b having a length of about 2 mm are provided at opposite end portions of the negative electrode active material layer 24 in the width direction, respectively. In addition, the width length of the facing center region 24a is typically more than the width length of each of the non-facing portion 24n and may be typically 5 mm or more (for example, 40 mm or more, preferably 80 mm or more, and more preferably 92 mm or more) and may be, for example, 199 mm or less (preferably 150 mm or less). In the embodiment disclosed herein, the width length of the facing center region 24a is about 92 mm.

A film containing a component derived from the oxalato complex compound is formed on the surface of the negative electrode active material layer 24 (typically, on the surface of the negative electrode active material). As a result, an interface between the negative electrode and the nonaqueous electrolytic solution is stable. Whether or not the film derived from the oxalato complex compound is formed on the negative electrode can be verified using various well-known structure analysis methods of the related art. For example, a method such as X-ray absorption fine structure spectroscopy (XAFS), time-of-flight secondary ion mass spectrometry (TOF-SIMS), or X-ray photoelectron spectroscopy (XPS) can be used. According to these analysis methods, information relating to the element composition of the outermost surface of the negative electrode active material layer 24 and the bond thereof can be obtained, and whether or not the surface of the negative electrode active material layer 24 contains a component (for example, $C_2O_4^{2-}$, B, or P) derived from the oxalato complex compound can be determined.

Here, in the negative electrode active material layer 24, the thickness of the film may be non-uniform in a penetration direction of the nonaqueous electrolytic solution (width direction of the wound electrode body 80). Therefore, the negative electrode active material layer 24 may have a portion in which the resistance locally increases. The negative electrode active material layer 24 of the lithium ion battery 100 disclosed herein is characterized in that the portion in which the resistance locally increases is disposed adjacent to the central line $C_0$ of the facing center region 24*a* in the width direction. Specifically, the portion in which the resistance locally increases is disposed in a width length region of less than 15% (preferably less than 10%) from the center. Accordingly, the deposition of lithium on the facing center region 24*a* can be efficiently suppressed. As a result, even when low-temperature high-rate charging and discharging is repeated, a highly durable lithium ion battery in which the deposition of lithium is suppressed can be realized. That is, a lithium ion battery having superior high-rate charging-discharging characteristics in various temperature environments can be realized.

Figure 4:
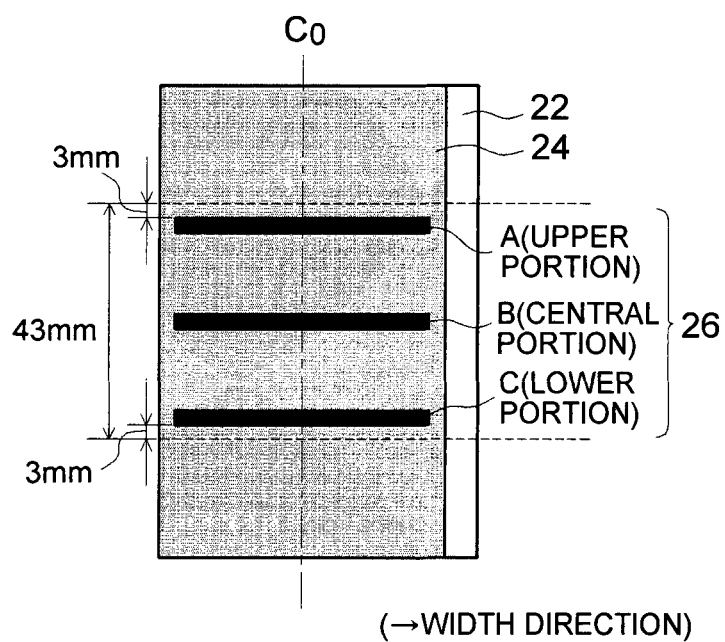
FIG. 4 is a plan view showing a negative electrode (measurement sample) which is cut at a predetermined number of turns.

A resistance distribution of the facing center region 24*a* in the width direction can be measured, for example, using the following method. First, the lithium ion battery 100 is disassembled, and the negative electrode sheet 20 positioned at an arbitrary number of turns is cut out. FIG. 4 is a plan view showing a negative electrode sheet which is cut at a predetermined number of turns. A thin gray portion represents the negative electrode active material layer 24. Here, the negative electrode active material layer 24 is positioned on the upper side of the lithium ion battery 100 shown in FIG. 1 toward a portion adjacent to the lid 54 of the battery case. This negative electrode is folded flat in the battery and has two creases (a crease on the upper R portion side and a crease on the lower R portion side). Next, in the facing center region of FIG. 4, plural measurement lines ranging from one end portion to another end portion in the width direction are set. In this case, the measurement lines are set such that at least one line is positioned in each of three regions into which the facing center region is equally divided in the longitudinal direction. That is, three or more measurement lines in total are set. It is preferable that the measurement lines are set at regular intervals in the longitudinal direction. In the embodiment shown in FIG. 4, three measurement lines A to C in total are set in a region near the crease on the upper R portion side, a region near the crease on the lower R portion side, and the center between the two ceases. The positions of the three measurement lines substantially correspond to A to C shown in FIG. 1. The resistance at each of the measurement lines is measured. The resistance can be measured using a well-known resistance measuring method of the related art. For example, the method can be performed with reference to Japanese Patent Application Publication No. 2014-25850 (JP 2014-25850 A). Specifically, in a state where a so-called Luggin capillary counter electrode is in contact with a measurement point, an AC current or an AC voltage is input between the counter electrode and the measurement point to measure an AC impedance. By performing this measurement on plural measurement points on the measurement lines (typically, continuously), the resistance distribution in the width direction can be measured.

In a general lithium ion battery of the related art, substantially the total injection amount of the nonaqueous electrolytic solution is impregnated into the wound electrode body from the viewpoint of reducing the cost. That is, the surplus nonaqueous electrolytic solution 60 is not present in a gap between the wound electrode body 80 and the battery case 50, or a small amount of the surplus nonaqueous electrolytic solution 60 is verified when the battery case 50 is inclined.

On the other hand, in a preferred embodiment of the lithium ion battery 100 disclosed herein, the surplus nonaqueous electrolytic solution 60 is present in a gap between the wound electrode body 80 and the battery case 50. When the lithium ion battery 100 is disposed (regularly) in a predetermined posture, at least a part of the wound electrode body 80 is dipped in the surplus nonaqueous electrolytic solution 60. In other words, at least a part of the wound electrode body 80 is positioned below a liquid surface 62 of the surplus nonaqueous electrolytic solution in the vertical direction. For example, one R portion (lower R portion) of the wound electrode body 80 is positioned below the liquid surface 62 of the surplus nonaqueous electrolytic solution in the vertical direction.

In another preferred embodiment, the liquid surface 62 of the surplus nonaqueous electrolytic solution is disposed on a winding flat portion 84 from the viewpoint of reducing the cost. In other words, the liquid surface 62 of the surplus nonaqueous electrolytic solution is positioned below the other R portion (upper R portion) of the wound electrode body 80. For example, when the battery is disposed (regularly) in a predetermined posture, a height region h of 1/10 to 1/4 of the height H of the wound electrode body 80 in the vertical direction may be dipped in the surplus nonaqueous electrolytic solution. In the embodiment shown in FIG. 1, a height region of about 1/8 of the height H of the wound electrode body 80 is dipped in the surplus nonaqueous electrolytic solution. An internal structure of the battery (specifically, a positional relationship between the wound electrode body 80 and the liquid surface 62 of the surplus nonaqueous electrolytic solution) can be clearly understood using a non-destructive inspection such as X-ray computed tomography (X-ray CT). Alternatively, the battery is disassembled, and the amount of the surplus nonaqueous electrolytic solution, the size of the battery case, and the size of the wound electrode body are calculated. Based on the calculation results, the above-described relationship can be understood.

In another preferred embodiment, in the state of the lithium ion battery 100, the oxalato complex compound (which may be in the form of an oxalato complex ion) remains in the nonaqueous electrolytic solution. As described above, the oxalato complex compound added during battery construction is consumed to form a film on the surface of the negative electrode (negative electrode active material layer). Accordingly, the oxalato complex compound in the nonaqueous electrolytic solution may be completely consumed. However, when the oxalato complex compound remains in the nonaqueous electrolytic solution, for example, when an unexpected situation such as the cracking of the negative electrode active material or the peeling of the negative electrode active material layer occurs due to repeated charging-discharging cycles, there is an advantageous effect in that a new film is formed on the surface of the exposed negative electrode (negative electrode active material).

<Use of Lithium Ion Battery>

The lithium ion battery disclosed herein can be used in various applications and has characteristics such as high energy density and superior durability. For example, the initial battery capacity is high, and even when high-rate charging and discharging is repeated in a low-temperature environment, high capacity retention can be maintained. Accordingly, using the above-described characteristics, the technique disclosed herein can be particularly preferably applied to a large-sized battery in which high capacity characteristics are required in various temperature environments. That is, preferable examples of an application target of the technique include a high capacity battery having a theoretical capacity of 3 Ah or higher; a high energy density battery having a theoretical capacity per unit volume of 10 Ah/L or higher (for example, 20 Ah/L or higher); and a battery which can be used in an application in which high-rate charging and discharging is repeated in a temperature environment of 0° C. or lower (for example, −30° C. to 0° C.) at 2 C or higher (for example 2 C to 50 C), 5 C or higher, 10 C or higher, and particularly 20 C or higher (for example, 20 C to 50 C).

The lithium ion battery (which may be in the form of a battery pack) disclosed herein can be preferably used as a power supply which is a driving source of a motor for driving a vehicle. The type of the vehicle is not particularly limited, and examples thereof include a plug-in hybrid vehicle (PHV), a hybrid vehicle (HV), an electric vehicle (EV), an electric truck, an electric scooter, an electric-assisted bicycle, an electric wheelchair, and an electric railway.

Hereinafter, several examples relating to the invention will be described, but the specific examples are not intended to limit the invention. Unless specified otherwise, the following battery construction is performed under the atmospheric pressure.

[Preparation of Positive Electrode Sheet]

$LiNi_{0.33}Co_{0.33}Mn_{0.33}O_2$ powder (LNCM oxide) as a positive electrode active material; acetylene black (AB) as a conductive material; polyvinylidene fluoride (PVDF) as a binder were prepared and were put into a kneading machine such that the mass ratio (LNCM oxide:AB:PVdF) of these materials was 91:6:3. The materials were kneaded while adjusting the viscosity using a small amount of N-methylpyrrolidone (NMP) to prepare a positive electrode slurry. Both surfaces of elongated aluminum foil (positive electrode current collector) were coated with the slurry in a belt shape having a width of 96 mm such that the coating weight per single surface was 7.7 mg/cm$^2$. After removing the solvent component by drying, the aluminum foil was roll-pressed using a roll pressing machine. As a result, a positive electrode sheet in which a positive electrode active material layer was formed on both the surfaces of the elongated positive electrode current collector was prepared.

[Preparation of Negative Electrode Sheet]

Natural graphite powder (C) as a negative electrode active material; carboxymethyl cellulose (CMC) as a thickener; and styrene-butadiene rubber (SBR) as a binder were prepared and were put into a kneading machine such that the mass ratio (C:CMC:SBR) of these materials was 98:1:1. The materials were kneaded while adjusting the viscosity using a small amount of ion exchange water to prepare a negative electrode slurry. Both surfaces of elongated copper foil (negative electrode current collector) were coated with the slurry in a belt shape having a width of 100 mm such that the coating weight per single surface was 5.1 mg/cm$^2$. After removing water by drying, the copper foil was roll-pressed using a roll pressing machine. As a result, a negative electrode sheet in which a negative electrode active material layer was formed on both the surfaces of the elongated negative electrode current collector was prepared.

Battery Assembly Construction (Example 1 and Comparative Examples 1 to 3)

The positive electrode sheet and the negative electrode sheet prepared as described above were laminated with two separator sheets interposed therebetween so as to obtain a laminate, and this laminate was wound by 29 turns to prepare a flat wound electrode body. At this time, the positive electrode active material layer, the separators, and the negative electrode active material layer were laminated such that the centers thereof were positioned at the same position in the longitudinal direction. As the separator sheet, a commercially available product was used, the product having a three-layer structure in which polypropylene (PP) was laminated on both surfaces of polyethylene (PE). Portions (non-facing portion) having a length of about 2 mm which did not face the positive electrode active material layer were provided at opposite end portions of the negative electrode active material layer in the width direction, respectively. The length of the facing portion of the negative electrode active material layer in the width direction was 96 mm. In the negative electrode active material layer, regions adjacent to the non-facing portions having a length of 2 mm were provided at opposite end portions. A region having a length of about 92 mm interposed between the regions adjacent to the non-facing portions is an absolute facing region. In addition, the length in the longitudinal direction corresponding to one turn is about 80 mm to 200 mm although it varies depending on whether to it is on a winding start side or winding end side.

Next, a positive electrode terminal and a negative electrode terminal were attached to a lid of a battery case, and these terminals were respectively welded to the positive electrode current collector and the negative electrode current collector which were exposed to end portions of the wound electrode body. The wound electrode body connected to the lid was put into the square battery case (inside dimension: length 12.5 mm×width 145 mm×height 90 mm) through an opening thereof, and the opening and the lid were welded. The lower portion of the wound electrode body and the bottom of the battery case were maintained to be substantially horizontal, and a gap therebetween (difference in height) was 2.2 mm. In other words, in the battery, about 3.99 ml or more (=1.25 cm×14.5 cm×0.22 cm) of surplus nonaqueous electrolytic solution was required such that the lower portion of the wound electrode body was dipped therein.

Next, a nonaqueous electrolytic solution was prepared. Specifically, $LiPF_6$ as a supporting electrolyte was dissolved in a mixed solvent at a concentration of 1.1 mol/L, the mixed solvent containing ethylene carbonate (EC), dimethyl carbonate (DMC), and ethyl methyl carbonate (EMC) at a volume ratio (EC:DMC:EMC) of 3:4:3. Further, 0.35 mass % of lithium bis(oxalato)borate (LiBOB) as an oxalato complex compound was added to the solution. The specific gravity of the nonaqueous electrolytic solution was about 1.24 g/cm$^3$. The nonaqueous electrolytic solution was injected in an amount (g) shown in Table 1 through an electrolytic solution injection hole provided through the lid of the battery case. In this way, three battery assemblies were constructed for each of Example 1 and Comparative Examples 1 to 3.

[Nonaqueous Electrolytic Solution Impregnation]

Figure 5A:
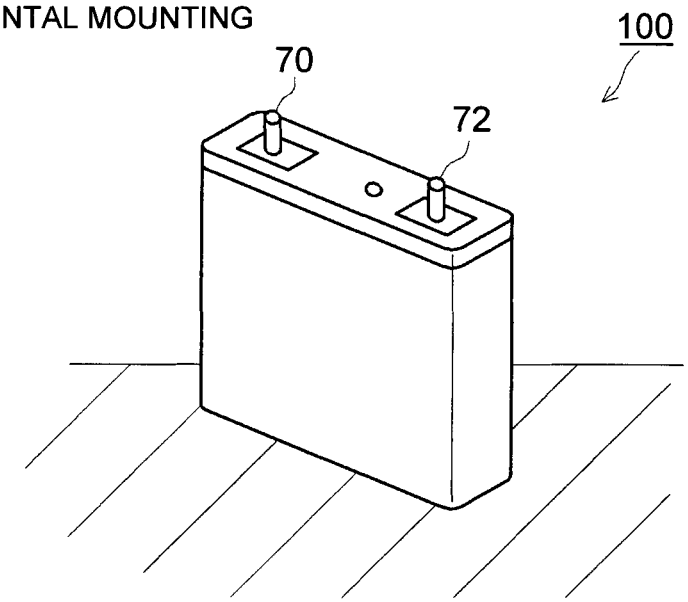

As shown in FIG. 5A, the battery of Example 1 was left to stand such that the positive and negative electrodes terminals faced upward and the width direction of the wound electrode body was substantially horizontal (horizontal mounting). In this state, the battery was held at 25° C. under the atmospheric pressure until the wound electrode body was sufficiently impregnated with the nonaqueous electrolytic solution (for 20 hours). After the impregnation, one battery was disassembled, and the amount of the surplus nonaqueous electrolytic solution which was not impregnated into the wound electrode body was 7.3 g (about 5.89 ml) when measured. In other words, after the impregnation, a part of the wound electrode body was dipped in the surplus nonaqueous electrolytic solution.

Figure 5B:
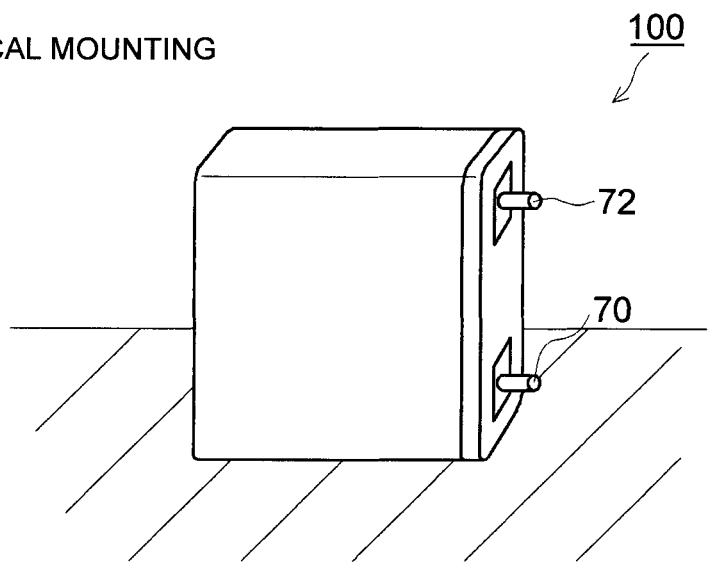
Figure 6A:
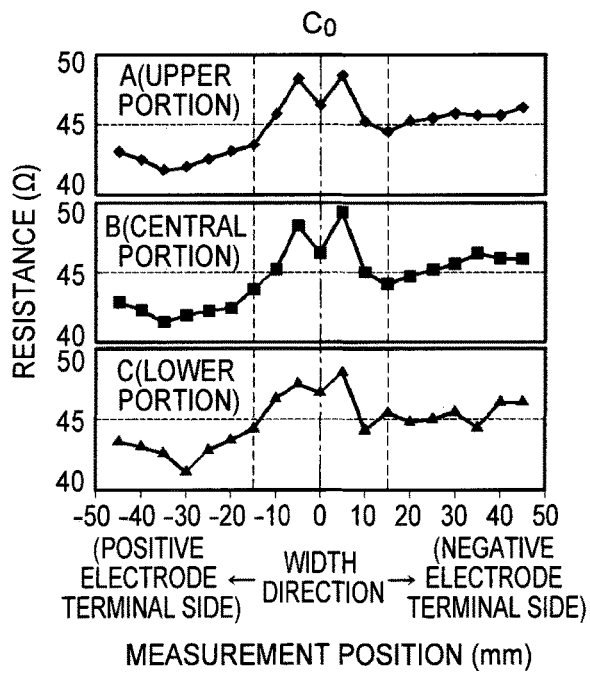
Figure 6B:
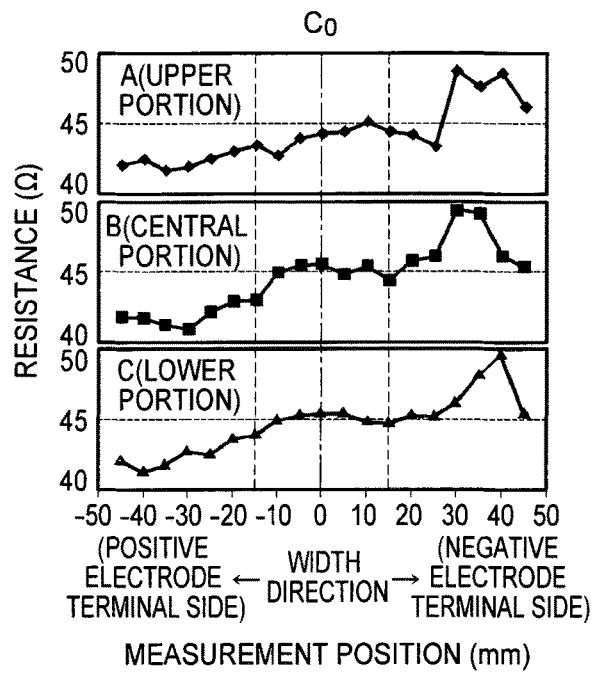
Figure 6C:
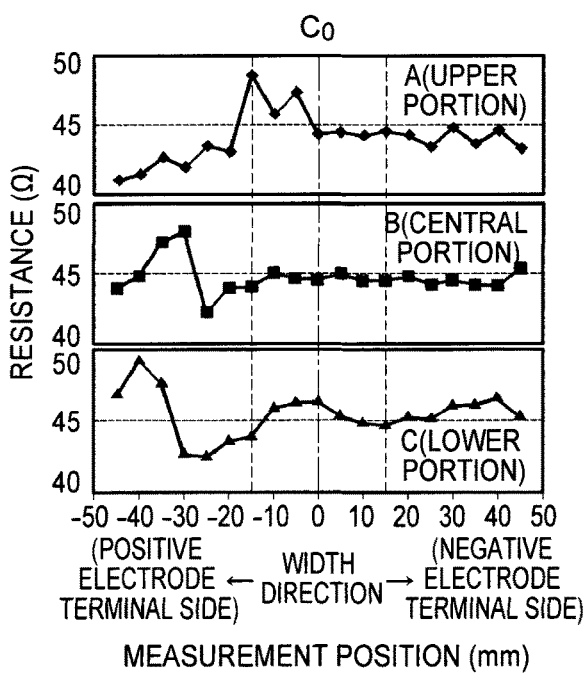
Figure 6D:
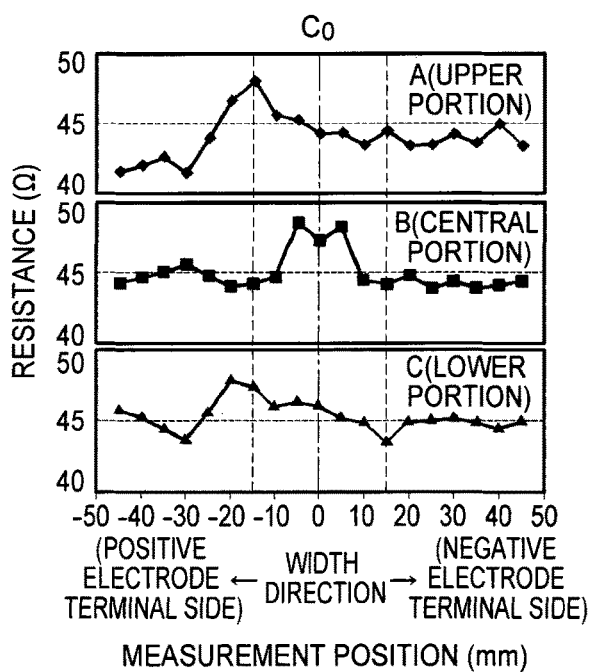

As shown in FIG. 5B, the battery of Comparative Example 1 was left to stand such that the positive electrode terminals faced downward and the longitudinal direction of the wound electrode body was substantially horizontal (vertical mounting). In this state, the battery was held at 25° C. under the atmospheric pressure until the wound electrode body was sufficiently impregnated with the nonaqueous electrolytic solution (for 20 hours). After the impregnation, one battery was disassembled, and the amount of the surplus nonaqueous electrolytic solution which was not impregnated into the wound electrode body was 7.1 g (about 5.73 ml) when measured. In other words, after the impregnation, a battery was left to stand for 5 minutes after the pressure was reduced to 0.001 MPa and then returned to the atmospheric pressure. Next, the battery was to stand for 5 minutes after the pressure was increased to 0.3 MPa and then returned to the atmospheric pressure. After the impregnation, the battery was disassembled, and the amount of the surplus nonaqueous electrolytic solution which was not impregnated into the wound electrode body was 7.3 g (about 5.89 ml) when measured. In other words, after the impregnation, a part of the wound electrode body was dipped in the surplus nonaqueous electrolytic solution. Table 1 collectively shows the injection amount of the nonaqueous electrolytic solution and the impregnation method thereof.

TABLE 1

Injection Amount and Impregnation Method of Nonaqueous Electrolytic Solution

|  | Injection Amount of Electrolytic Solution | Impregnation Method | | Amount of Surplus Electrolytic Solution After Impregnation | Lowermost Portion of Electrode Body |
|---|---|---|---|---|---|
|  |  | Mounting Method (Refer to FIG. 5) | Pressure |  |  |
| Example 1 | 45 g | (a) Horizontal Mounting | Atmospheric Pressure | 7.3 g | Impregnated with Electrolytic Solution |
| Comparative Example 1 | 45 g | (b) Vertical Mounting | Atmospheric Pressure | 7.1 g | Impregnated with Electrolytic Solution |
| Comparative Example 2 | 42 g | (a) Horizontal Mounting | Atmospheric Pressure | 4.3 g | Not Impregnated with Electrolytic Solution |
| Comparative Example 3 | 45 g | (a) Horizontal Mounting | Increased Pressure | 7.3 g | Impregnated with Electrolytic Solution | part of the wound electrode body was dipped in the surplus nonaqueous electrolytic solution.

As shown in FIG. 5A, the battery of Comparative Example 2 was left to stand such that the positive and negative electrodes terminals faced upward and the width direction of the wound electrode body was substantially horizontal (horizontal mounting). In this state, the battery was held at 25° C. under the atmospheric pressure until the wound electrode body was sufficiently impregnated with the nonaqueous electrolytic solution (for 20 hours). After the impregnation, one battery was disassembled, and the amount of the surplus nonaqueous electrolytic solution which was not impregnated into the wound electrode body was 4.3 g (about 3.47 ml) when measured. In other words, after the impregnation, the wound electrode body was not dipped in the surplus nonaqueous electrolytic solution.

The battery of Comparative Example 3 was disposed in a chamber in an environment of 25° C. and, as shown in FIG. 5A, was left to stand such that the positive and negative electrodes terminals faced upward and the width direction of the wound electrode body was substantially horizontal (horizontal mounting). In this state, while repeating a treatment of increasing or decreasing the pressure, the battery was held until the wound electrode body was sufficiently impregnated with the nonaqueous electrolytic solution (for 8 hours). In the treatment of increasing or decreasing the pressure, the following cycle was repeated three times. In the cycle, the

[Initial Charging•Aging]

Each of the battery assemblies in which the wound electrode body was impregnated with the nonaqueous electrolytic solution was initially charged and aged. Specifically, in an environment of 25° C., the battery assembly was charged at a constant current of 1 C (CC charging) until a voltage between the positive and negative electrode terminals reached 4.1 V and was left to stand in a thermostatic chamber at 50° C. for 24 hours. As a result, lithium ion batteries (Example 1 and Comparative Examples 1 to 3) were obtained.

[Resistance Measurement of Negative Electrode Active Material Layer]

After being discharged to SOC 20%, the battery was disassembled to extract the negative electrode therefrom. From the winding inner periphery side of the negative electrode, a portion at two turns having a length of 43 mm was cut out to obtain a measurement sample 26 (refer to FIG. 4). Regarding the absolute facing region of the measurement sample 26, the length in the longitudinal direction was 43 mm, and the length in the width direction was 92 mm.

Next, this measurement sample was slightly washed with a solvent (EMC) and was put into a container filled with an electrolytic solution. As shown in FIG. 4, three measurement lines A to C were set on the measurement sample. The positions of the three measurement lines A to C correspond to A to C shown in FIG. 1.

(A) Upper portion: portion at a distance of 3 mm from the crease (on the upper R portion side) provided on the upper side in the battery
(C) Lower portion: portion at a distance of 3 mm from the crease (on the lower R portion side) provided on the lower side in the battery
(B) Central portion: central portion between the two creases.

Regarding these three measurement lines, the resistance was measured with an AC impedance method using a Luggin capillary counter electrode. Specifically, resistances of 19 measurement points in total provided at regular intervals (5 mm) were measured in a line direction moving from one end portion in the width direction to another end portion in the straight line direction. The specification of the Luggin capillary counter electrode, the measurement conditions of the AC impedance method are as follows.

Luggin Capillary Counter Electrode
Luggin capillary: TERUMO needleless syringe (formed of polypropylene)
Counter electrode: negative electrode sheet (not charged, area of negative electrode active material layer: 30 cm$^2$)
Electrolytic solution: solution in which 1.1 mol/L of LiPF$_6$ was dissolved in a mixed solvent containing EC, DMC, and EMC at a volume ratio (EC:DMC:EMC) of 30:40:30
End portion of measurement portion: ϕ2 mm (cross-sectional area: 0.03 cm$^2$)
AC Impedance Method
Measuring device: "1287 potentiostat/galvanostat" and "1255B frequency response analyzer (FRA)" manufactured by Solartron
Input voltage: 500 mV
Measurement frequency range: 100 kHz to 0.5 Hz In the obtained Cole-Cole plot, a resistance value ($R_1$ ($\Omega$)) of each measurement point was calculated by subtracting a value ($R_0$) at an intersection with a real axis on a high frequency side from a value ($R_{0+1}$) at an intersection with a real axis on a low frequency side. The results are shown in FIGS. 6A to 6D.

As shown in FIGS. 6A to 6D, in the battery of Comparative Example 1, in all the three measurement lines, the highest resistance point was present at a position (an end portion of the active material layer in the width direction) at a distance of 30 mm to 40 mm from the central line $C_0$ in the width direction. In the battery of Comparative Example 2, in order of the upper portion, the central portion, and the lower portion, the highest resistance point was moved to a position (on the end portion side in the width direction) more distant from the center. In the battery of Comparative Example 3, in order of the central portion, the upper portion, and the lower portion, the highest resistance point was moved to a position (on the end portion side in the width direction) more distant from the center. On the other hand, in the battery of Example 1, in all the three measurement lines, the highest resistance point was present in a length region of less than 10% from the central line $C_0$ in the width direction. It can be seen from the above results that the highest resistance point varies depending on, for example, the impregnation method of the nonaqueous electrolytic solution.

[Measurement of Initial Capacity]

In a temperature environment of 25° C., the battery was charged and discharged according to the following operations (1) to (3) in a voltage range of 3.0 V to 4.1 V. As a result, the initial capacity was determined. (1) The battery was charged at a constant current of 5 A (CC charging) until the voltage reached 4.1 V. Next, the battery was charged at a constant voltage (CV charging) until the current reached 0.01 A. (2) The operation was stopped for 1 hour. (3) The battery was discharged at a constant current of 5 A (CC discharging) until the voltage reached 3.0 V. Next, the battery was discharged at a constant voltage (CV discharging) until the current reached 0.01 A. At this time, the CCCV discharge capacity was set as the initial capacity.

[Lithium Deposition Evaluation]

In an environment of −10° C., the aged battery was adjusted to SOC 75%. 5 seconds of high-rate pulse charging was performed on the battery 1000 times. The current value during charging was set to be a value shown in Table 2 (90 A, 95 A, 100 A). After 1000 cycles, as in the case of the initial capacity, the battery capacity after the high-rate pulse charging was calculated. Based on the battery capacity after the high-rate pulse charging and the initial capacity, a capacity retention was calculated according to the following equation "Capacity Retention (%)=(Battery Capacity after Pulse Charging/Initial Capacity×100). The results are shown in the corresponding items of Table 2. In addition, after the lithium deposition test, the battery was disassembled to extract the negative electrode therefrom, and whether or not lithium was deposited was determined by visual inspection. The results are shown in the corresponding items of Table 2. In Table 2, "O" represents a case where the deposition of lithium was not observed (no Li deposition), and "X" represents a case where the deposition of lithium was observed (Li deposition observed). The results are shown in the corresponding items of Table 2.

TABLE 2

Results of High-Rate Pulse Charging

| Charging-Discharging Current | | Example 1 | Comparative Example 1 | Comparative Example 2 | Comparative Example 3 |
|---|---|---|---|---|---|
| 90 A | Li Deposition | O | X | O | O |
|  | Capacity Retention | 99.8% | 85.2% | 95.6% | 98.8% |
| 95 A | Li Deposition | O | X | X | O |
|  | Capacity Retention | 99.7% | 70.4% | 88.8% | 95.2% |
| 100 A | Li Deposition | O | X | X | X |
|  | Capacity Retention | 96.2% | 45.4% | 72.2% | 86.2% |

As shown in Table 2, in the batteries of Comparative Examples 1 to 3, as the current value increased, the deposition of lithium was observed. On the other hand, in the battery of Example 1, even when 100 A of high-rate charging and discharging was repeated, the deposition of lithium was not observed. Further, in the battery of Example 1, the capacity retention was also maintained to be higher than those of the batteries of Comparative Examples 1 to 3. That is, it was found that durability during a low-temperature high-rate cycle was superior.

[Check of Inner Temperature of Battery]

Figure 7:
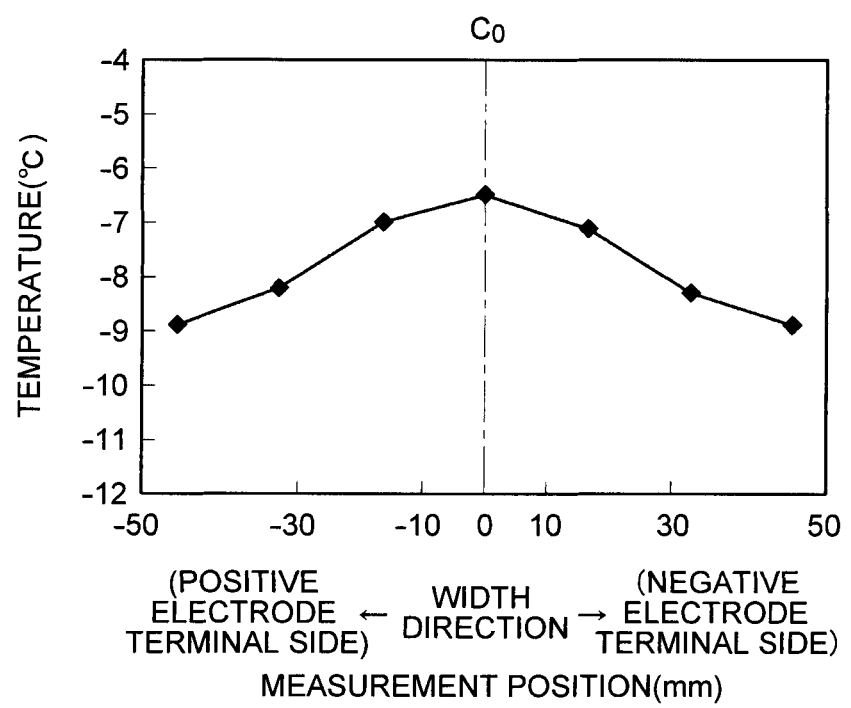
FIG. 7 is a graph showing an internal temperature distribution of a battery of Example 1.

In order to examine the reason why the battery of Example 1 was superior in durability, a battery having the same configuration as that of Example 1 was constructed, and the transition of the inner temperature of the battery was checked. Specifically, in the center of the innermost periphery of the electrode body, thermocouples were disposed in a region from one end portion to another end portion in the width direction at an interval of 15 mm. As in the case of the lithium deposition evaluation, 100 cycles of high-rate pulse charging and discharging were performed in an environment of −10° C., and then an inner temperature distribution of the battery was checked. The results are shown in FIG. 7. In FIG. 7, the vertical axis represents the electrode temperature (Celsius degree) during the cycles, and the horizontal axis represents the same as that of FIG. 6.

As shown in FIG. 7, it was found that the temperature in the center of the battery in the width direction was higher than that of an end portion by about 2.4° C. In general, the internal resistance of the lithium ion battery (for example, the electric resistance of the nonaqueous electrolytic solution) decreases along with an increase in temperature. Therefore, by disposing the highest resistance point in the central portion in the width direction having a relatively high temperature, apparently, the resistance at this point can be reduced. As a result, it is considered that the resistance in the negative electrode active material layer is made to be uniform, and a charging-discharging balance was maintained to be good. As described above, by disposing the highest resistance point of the negative electrode at the central position of the wound electrode body, a battery where the deposition of lithium is suppressed can be realized.

Hereinabove, the invention has been described in detail, but the above-described embodiments and examples are merely exemplary. The invention disclosed herein includes various modifications and alternations of the above-described specific examples.

What is claimed is:
1. A lithium ion battery comprising:
a wound electrode body that is obtained by disposing an elongated positive electrode and an elongated negative electrode to face each other in an insulated state so as to obtain a laminate and winding the laminate in a longitudinal direction by a predetermined number of turns, in which the elongated positive electrode includes an elongated positive electrode current collector and a positive electrode active material layer attached to the positive electrode current collector, and the elongated negative electrode includes an elongated negative electrode current collector and a negative electrode active material layer attached to the negative electrode current collector;
a nonaqueous electrolytic solution that contains at least a supporting electrolyte and a nonaqueous solvent; and
a battery case that accommodates the wound electrode body and the nonaqueous electrolytic solution, wherein
the negative electrode active material layer includes a film containing a component derived from an oxalato complex compound and is formed to be wider than the positive electrode active material layer in a width direction perpendicular to the longitudinal direction,
the negative electrode active material layer includes a facing portion which faces the positive electrode active material layer and non-facing portions which do not face the positive electrode active material layer,
in measurement lines of the facing portion, a highest resistance value is present in a length region of less than 15% from a center of a facing center region in the width direction,
the facing center region is a region of the facing portion excluding regions adjacent to the non-facing portions,
the measurement lines are plural straight lines ranging from one end to another end in the width direction, and
the resistance value is measured at each of the measurement lines, wherein a gap is provided between a lowermost end of the wound electrode body and a bottom inner side of the battery case,
a surplus nonaqueous electrolytic solution is present in the gap, and
at least a part of the wound electrode body is dipped in the surplus nonaqueous electrolytic solution in an environment of 25° C.
2. The lithium ion battery according to claim 1, wherein the measurement lines are set such that one or more lines are positioned in each of three regions into which the facing center region at an appropriate predetermined number of turns is equally divided in the longitudinal direction, that is, three or more lines in total are positioned in the three regions.
3. The lithium ion battery according to claim 2, wherein in all the measurement lines, a highest resistance value is present in a length region of less than 10% from the center of the facing center region in the width direction.
4. The lithium ion battery according to claim 1, wherein a length of the facing center region in the width direction is 92 mm or longer.
5. The lithium ion battery according to claim 1, wherein the negative electrode active material layer includes the non-facing portions at opposite end portions of the facing portion in the width direction, and
a length of each of the non-facing portions in the width direction is 0.5 mm or longer.
6. The lithium ion battery according to claim 1, wherein the battery is disposed so that the elongated positive electrode and the elongated negative electrode face upward and the width direction of the wound electrode body is horizontal, and a height region of $1/10$ to $1/4$ of the height of the wound electrode body in the vertical direction is dipped in the surplus nonaqueous electrolytic solution.
7. A method of manufacturing the lithium ion battery according to claim 1, the method comprising:
adding an oxalato complex compound to the nonaqueous electrolytic solution to prepare a nonaqueous electrolytic solution containing an oxalato complex compound;
accommodating the wound electrode body and the nonaqueous electrolytic solution containing an oxalato complex compound in the battery case under the atmospheric pressure to construct a battery assembly;
impregnating the wound electrode body with the nonaqueous electrolytic solution containing an oxalato complex compound while maintaining an internal pressure of the battery case to be the atmospheric pressure and maintaining the width direction of the wound electrode body to be horizontal, in which the surplus nonaqueous electrolytic solution remains in the gap between the lowermost end of the wound electrode body and the bottom inner side of the battery case after the impregnation; and
initially charging the battery assembly in a state where at least a part of the wound electrode body is dipped in the surplus nonaqueous electrolytic solution.
8. The method according to claim 7, wherein
lithium bis(oxalato)borate is used as the oxalato complex compound, and
an addition amount of the lithium bis(oxalato)borate is 0.1 mass % or more with respect to the total mass of the nonaqueous electrolytic solution.

* * * * *